United States Patent
Mitchell et al.

(10) Patent No.: US 7,436,961 B2
(45) Date of Patent: Oct. 14, 2008

(54) SENTINEL SYNCHRONIZATION METHOD FOR ENHANCING QKD SECURITY

(75) Inventors: Howell Mitchell, Amherst, NH (US); Harry Vig, North Billerica, MA (US)

(73) Assignee: MagiQ Technologies, Inc., New York, NY (US)

( * ) Notice: Subject to any disclaimer, the term of this patent is extended or adjusted under 35 U.S.C. 154(b) by 820 days.

(21) Appl. No.: 11/075,429

(22) Filed: Mar. 8, 2005

(65) Prior Publication Data
US 2006/0204010 A1 Sep. 14, 2006

(51) Int. Cl.
*H04L 9/00* (2006.01)
*H04K 1/00* (2006.01)

(52) U.S. Cl. .................. 380/256; 380/278
(58) Field of Classification Search .......... None
See application file for complete search history.

(56) References Cited

U.S. PATENT DOCUMENTS

| | | | |
|---|---|---|---|
| 6,438,234 | B1 | 8/2002 | Gisin et al. |
| 7,006,635 | B2 * | 2/2006 | Parks et al. .......... 380/263 |
| 2002/0041687 | A1 * | 4/2002 | Parks et al. .......... 380/263 |
| 2003/0231771 | A1 * | 12/2003 | Gisin et al. .......... 380/255 |
| 2006/0018475 | A1 * | 1/2006 | Vig et al. .......... 380/256 |
| 2006/0198521 | A1 * | 9/2006 | Young et al. .......... 380/256 |
| 2007/0058810 | A1 * | 3/2007 | Tanaka et al. .......... 380/210 |
| 2007/0092083 | A1 * | 4/2007 | Young et al. .......... 380/278 |
| 2007/0140495 | A1 * | 6/2007 | Berzanskis et al. .......... 380/278 |

FOREIGN PATENT DOCUMENTS

WO 2005/091548 A1 * 9/2005
WO 2007/050285 A2 * 5/2007

OTHER PUBLICATIONS

Janzing et al, "Quasi-Order of Clocks and Their Synchronism and Quantum Bounds for Copying Timing Information", Jan. 2003, IEEE Transactions on Information Theory, vol. 49, No. 1, p. 230-240.*
Maeda et al, "High-Speed QKD System Synchronized by Automatic Phase-Alignment Mechanism", Mar. 2005, Optical Fiber Communication Conference 2005, vol. 3, p. 1-3.*
Bethune et al., "Autocompensating quantum cryptography," New Jour. of Phys., 4(2002) 42.1-42.15 (published Jul. 12, 2002).

* cited by examiner

*Primary Examiner*—Christopher A Revak
(74) *Attorney, Agent, or Firm*—Opticus IP Law PLLC

(57) ABSTRACT

A method of improving the security of a QKD system is disclosed. The method includes sending synchronization ("sync") signals from a first QKD station to the second QKD station over a sync signal channel and recording data relating to the arrival times of the sync signals at the second QKD station. The method also includes processing the arrival time data to discern between extra signals in the sync signal channel that were not sent by the first QKD station over the sync channel, and sync signals that were sent by the first QKD station over the sync channel. The method also includes sending an alarm signal when it is determined that extra signals in the sync channel could be due to an attack on the QKD system.

7 Claims, 3 Drawing Sheets

US 7,436,961 B2

SENTINEL SYNCHRONIZATION METHOD FOR ENHANCING QKD SECURITY

CROSS-REFERENCE TO RELATED APPLICATIONS

The present invention is related to pending PCT Patent Application Serial No. PCT/US04/02429, published on Aug. 26, 2004 as WO 2004/073234 A2, which patent application is incorporated by reference herein.

FIELD OF THE INVENTION

The present invention relates to quantum cryptography, an in particular relates to methods of monitoring the operation of a quantum key exchange (QKD) system to enhance system security.

BACKGROUND OF THE INVENTION

Quantum key distribution involves establishing a key between a sender ("Alice") and a receiver ("Bob") by using weak (e.g., 0.1 photon on average) optical signals or "qubits" transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the qubits will introduce errors and reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

The above-mentioned references by Bennett each describe a QKD system wherein Alice randomly encodes the polarization or phase of single photons at one end of the system, and Bob randomly measures the polarization or phase of the photons at the other end of the system. The system described in the Bennett 1992 paper is based on two optical fiber Mach-Zehnder interferometers. Respective parts of the interferometric system are accessible by Alice and Bob so that each can control the phase of the interferometer.

In a QKD system, the operation of the key elements— namely, the laser, the modulators and the single-photon detectors (SPDs)—need to be synchronized. This is accomplished by sending synchronization ("sync") signals between the two stations of the QKD system—either both ways or one way— over a sync channel. The modulators and the detectors are gated via the sync signals to the expected arrival times of photons emitted by the laser. This gating maximizes the security of the system by minimizing an eavesdropper's ability to deduce the state of the modulators. If an eavesdropper were to know the state of Alice's modulator, she would be able to deduce the value of the exchanged pulses (qubits) and thus deduce information about the exchanged key. Gating of the SPDs also reduces false counts, e.g., due to dark count noise.

In a commercial QKD system, there is a strong desire to use the existing single optical fiber link to carry all three QKD channels, namely: the public discussion channel, the sync channel, and the single photon ("quantum") channel. In such systems, an attack on the system can occur in which the eavesdropper/attacker injects light into the optical fiber link with the same wavelength as the sync signal. In one form of attack, the injected light is inserted into the sync channel with the intent of destabilizing the QKD system, e.g., by altering the system timing. Another possibility is for the eavesdropper/attacker to inject light into the sync channel with the hope of having the modulator at Alice in a two-way QKD system modulate the injected signal before it is reflected out of Alice and back to Bob. The modulated injected signal could then be examined, and thereby reveal information about the modulator state at Alice, which ultimately could yield information about the exchanged key.

SUMMARY OF THE INVENTION

The present invention relates to quantum cryptography, an in particular relates to methods of monitoring the operation of a quantum key exchange (QKD) system to enhance system security. An aspect of the invention is a method that includes collecting and processing data relating to the arrival times of synchronization ("sync") signals sent from one QKD station to another and compare the actual arrival times to the expected arrival times. The analyzed data is then used to detect extra signals that show up in the sync channel beyond those that were actually sent over the sync channel from one QKD station to the other. These extra signals are then identified as either noise or as intentionally introduced in an attempt to breach system security. In response to the analyzed data, the system may either keep operating in the instance where the spurious signals are deemed noise, or terminate operating in the instance where the spurious signals are deemed malicious.

DETAILED DESCRIPTION OF THE INVENTION

Figure 1:
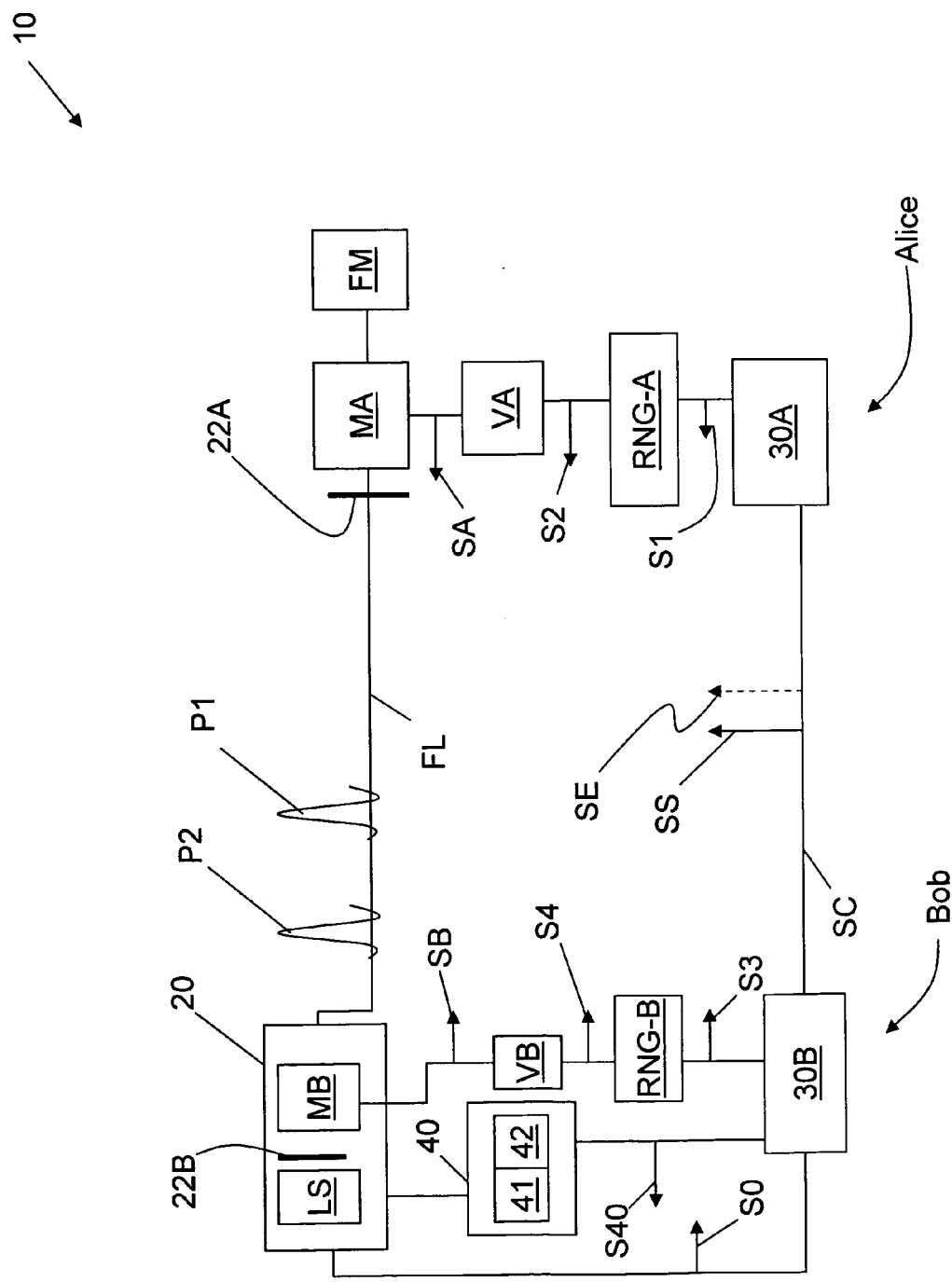
FIG. 1 is a schematic diagram of a two-way QKD system having two QKD stations Bob and Alice linked by an optical fiber link FL, and also linked by a synchronization ("sync") channel over which sync signals, as well as spurious signals, travel.

FIG. 1 is a schematic diagram of a two-way QKD system 10 having two QKD stations Bob and Alice linked by an optical fiber link FL. Bob includes an optical system 20 adapted to generate two coherent optical pulses P1 and P2. Optical system 20 also include a phase modulator MB, a laser source LS, and a variable attenuator 22B. Phase modulator MB is coupled to a voltage controller VB, which is coupled to a random number generator unit RNG-B. RNG-B, in turn, is coupled to a controller 30B. Controller 30B is also coupled to optical system 20. Bob also includes a detector unit 40 operably coupled to optical system 20 and to controller 30B. Detector unit 40 includes two single-photon detectors (SPDs) 41 and 42.

Alice includes a phase modulator MA optically coupled at one end to optical fiber link FL and at the opposite end to a Faraday mirror FM. Also optionally includes a variable attenuator 22A upstream of modulator MA. Alice also includes voltage controller VA coupled to phase modulator MA, and a random number generator RNG-A coupled to the voltage controller Alice further includes a controller 30A coupled to random number generator RNG-A.

Bob's controller 30B is coupled (optically or electronically) to Alice's controller 30B via a synchronization channel SC to synchronize the operation of Alice and Bob via synchronization signals SS. In particular, the operation of the phase modulators MA and MB is coordinated by controllers 30A and 30B by exchanging synchronization signals SS that correspond to expected arrival times of qubits (pulses) to be modulated.

Also shown in FIG. 1 is an extra signal SE in sync channel SS. The detection and analysis of extra signals SE in the sync channel is discussed in detail below.

QKD System Method of Operation

In an example embodiment of the operation of QKD system 10, Bob's controller 30B activates optical system 20 via an activation signal S0 to generate coherent optical pulses P1 and P2 having orthogonal polarizations. The pulses pass through Bob's modulator MB, which remains inactive, and optionally through variable attenuator 22, which attenuates the pulses. The pulses then travel over to Alice via optical fiber link FL.

Pulses P1 and P2 then pass through Alice's phase modulator MA, which remains inactive. The pulses reflect off of Faraday mirror FM, which rotates the polarization of the pulses by 90°. As the pulses travel back through modulator MA, Alice lets the first pulse P1 pass through unmodulated, but modulates the phase (i.e., imparts a phase shift $\phi_A$ to) second pulse P2.

The modulation of pulse P2 at Alice is carried out by controller 30A providing a well-timed signal S1 to random number generator RNG-A, which provides a signal S2 representative of a random number to voltage controller VA. In response, voltage controller VA sends a randomly selected voltage control signal SA (e.g., V[+3π/4], [V−3π/4], V[+π/4], or V[−π/4]) to modulator MA to set the phase modulation to a corresponding randomly selected phase shift $\phi_A$=+3π/4, −3π/4, π/4, or −π/4.

The two pulses P1 and P2 then pass through attenuator 22A, which ensures that the pulses are single-photon level (i.e., statistically having one photon or less per pulse). The pulses travel back to Bob, where pulse P2 passes unaltered through modulator MB, but where Bob imparts a randomly selected phase shift $\phi_B$ to pulse P1. The modulation is carried out by controller 30B providing a well-timed signal S3 to RNG-B, which provide a signal S4 representative of a random number to voltage controller VB. In response, voltage controller VB sends a randomly selected voltage control signal SB (e.g., V[+π/4] or V[−π/4]) to modulator MB to set the phase modulation to a corresponding value of +π/4 or −π/4.

Further, pulses P1 and P2 enter optical system 20 where they are recombined to interfere. SPDs 41 and 42 are arranged so that constructive interference ($\phi_A-\phi_B$=0) is detected by SPD 41, and destructive interference ($\phi_A-\phi_B$=π) is detected by SPD 42.

When Bob imparts the same basis phase as Alice, a count in SPD 41 indicates binary 0 and a count in SPD 42 indicates binary 1. However, when Bob's basis phase is different from Alice's, there is no correlation and the count winds up in either SPD 41 or 42 with equal probability (i.e., the interfered pulse has a 50:50 chance of being detected in either SPD). The resulting detected signal in detection unit 40 is transmitted to controller 30B via a detector signal S40, where the detected phases are stored, along with the modulation states imparted to modulator MB.

Figure 2:
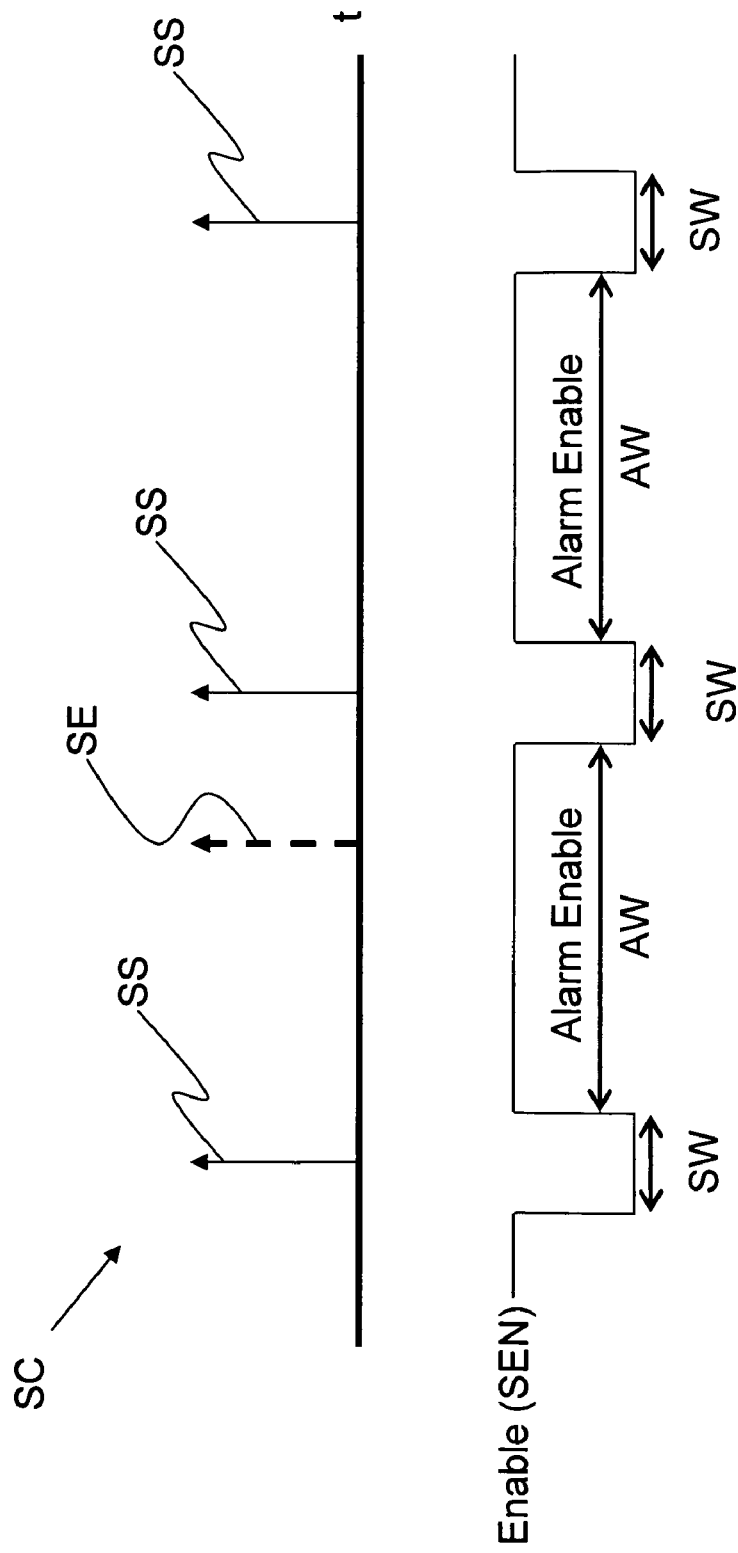
FIG. 2 is a schematic timing diagram showing the sync signal pulses along with their gating intervals, and also showing an extra signal in the sync channel.

FIG. 2 is a timing diagram illustrating sync signals SS in sync channel SC. Typically, the duty cycle of sync signal SS is very low, e.g., on the order of 0.5%. Such a low sync duty cycle means that there is a very short period of time over which an eavesdropper can "listen" to the qubit modulation in order to obtain the qubit data. Sync signal SS has an expected arrival time defined by a sync signal timing window SW, which in an example embodiment is ~±1% of the sync signal rate. For example, for a sync signal rate of 1 MHz, the sync timing window SW is about 0.02 microseconds wide.

In the example system of FIG. 1, sync signals SS are received by controller 30B, which then controls the timing of the other time-sensitive elements of Bob, such as the modulator MB and the gating of the SPD detectors 41 and 42 in detection unit 40.

Controllers 30A and 30B record the phase modulations applied to modulators MA and MB, respectively, during the modulator gating intervals so that a secure key can be established between Alice and Bob using the known QKD protocols and procedures.

Note that the sync channel SC in FIGS. 1 and 2 also includes an extra signal SE in the sync channel SC. Extra signal SE can be either from system noise or from an eavesdropper/attacker attempting to gain information about the operation of the QKD system through the sync channel. Thus, the sync channel SC needs to be monitored to maintain system security, as described below.

Sentinel Sync Mode

Figure 3:
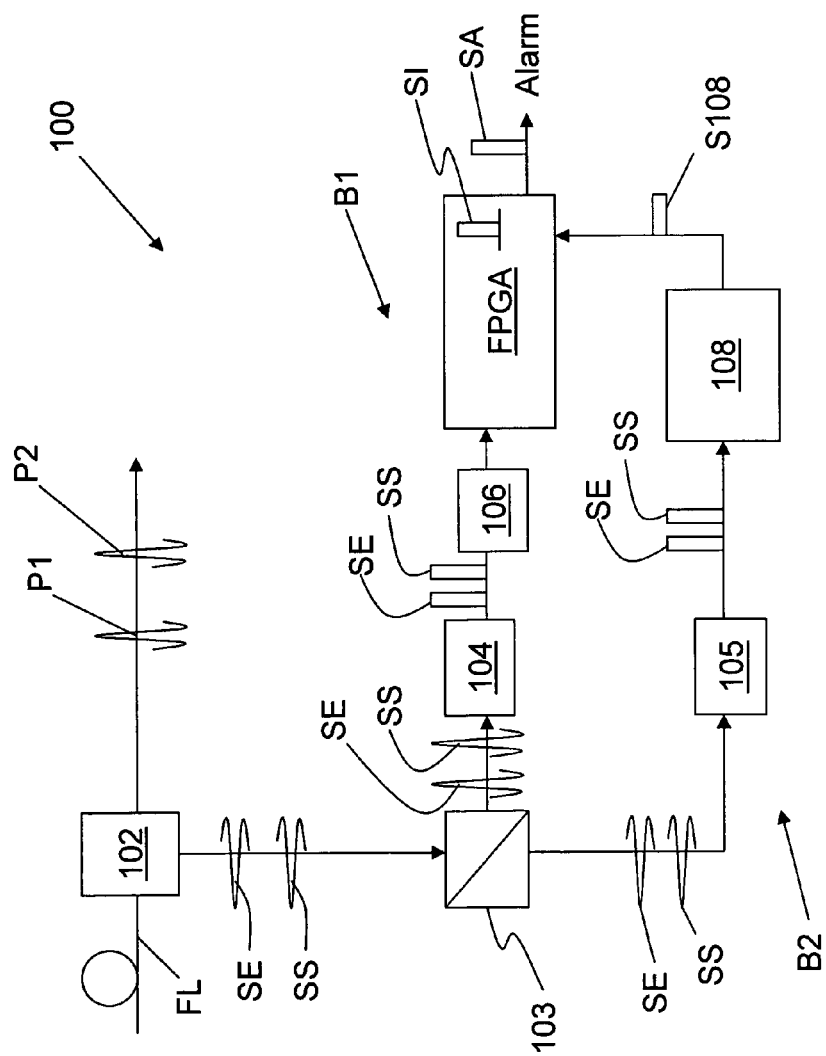
FIG. 3 is a close-up schematic diagram of Alice illustrating an apparatus for processing signals in the sync channel to detect the presence of extraneous signals in the sync channel.

FIG. 3 is a schematic close-up diagram of a section 100 of either Alice or Bob for QKD system 10 in which the quantum channel, the sync channel SS and the public channel are all carried over optical fiber link FL. Section 100 includes a demultiplexer unit 102 coupled to optical fiber link FL. Demultiplexer unit is adapted to separate the quantum channel signals P1 and P2 (say, at a wavelength of 1550 nm) from the signals SS and SE in sync channel SC (say, at a wavelength of 1540 nm). A beam splitter 103 optically coupled to demultiplexing unit 102 splits each signal SS and SE into two corresponding signals. The pairs of signals SS and SE exit beamsplitter 103 and travel to two different branches B1 and B2. Branches B1 and B1 each include respective optical-to-electrical (O/E) converters 104 and 105 that converts the optical signals SS and SE into their electrical counterparts, also labeled as SS and SE. The output of O/E converter 104 is presented to a "sync detect" circuit 106 that performs a variable threshold, single-bit analog-to-digital conversion on the electrical signals SS and SE. The single-bit output of 104 is passed to the FPGA, which records the arrival of each signal. The FPGA is adapted to discern the sync timing windows SW. These timing windows are used by the FPGA to establish the internal sync signal Si that supports the FPGA's QKD (quantum key distribution) functions.

In the second branch B2, the output of O/E converter 105 is directed to an analog-to-digital (A/D) converter 108, which is also coupled to the FPGA. Signals SS and SE are converted to eight-bit digital output, which is provided to the FPGA via a signal 108. Thus, A/D converter is constantly sampling the sync channel for arriving pulses and providing the information to the FPGA via signal S108.

With reference again also to FIG. 2, the FPGA generates an enable signal SEN with sync timing windows SW that enclose the worst-case timing variation in sync signal SS. Enable signal SEN also includes an "Alarm Enable" timing window AW. Any inappropriate pulses or voltage levels that are detected during the Alarm Enable timing window AW are interpreted as an attack and generates an alarm signal SA so that the user can be made aware of the situation and take remedial action, e.g., terminating the key exchange process.

Controllers 30A and 30B, which in example embodiment include the FPGA of section 100, are adapted to take data on the arrival and/or departure of sync signals SS in the sync channel of the QKD system. In the operation of QKD system 10, the sync signal SS is not perfect due to transmission and circuit effects. Even in the presence of significant noise, the characteristic frequency spectrum of a proper sync signal is predictable and identifiable.

Accordingly, the FPGAs in controllers 30A and/or 30B are adapted to perform Fourier signal processing to distinguish between legitimate signals in the sync channel that are expected to arrive within certain arrival time windows, and those suspect signals that arrive outside of the arrival time windows. In an example embodiment, the signal processing includes performing a Fourier analysis of the sync channel signal spectrum and setting a noise threshold. This allows the user to ascertain whether errors in the arrival time of sync signal SS are due to noise (below the threshold) or due to an extra signal SE purposely inserted into the sync channel by an eavesdropper (above the noise threshold). If errors are deemed to be from noise, then operation of the system continues. However, if an error is deemed to be from an eavesdropper/attacker sending an extra signal SE, then the alarm signal SA is generated and the operation of the system is shut down.

In an example embodiment, Bob is the timing master for the QKD system and Alice is the slave. In this instance, the "sentinel sync" monitoring of the arrival of sync signals need only be performed at Alice. This is because in such a case, the slave Alice is more susceptible to false sync signals than is the master Bob.

Another distinct advantage that results from using an analog-to-digital (A/D) converter 108 is that it can distinguish between pulses have different amplitudes. A potential intruder may attempt to fool the QKD system by injecting the extra signal SE at a different amplitude, which is detectable by the analog-to-digital (A/D) converter 108, but not by the "sync detect" circuit 106.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of operating a QKD system having operably coupled first and second QKD stations, comprising:
    sending synchronization ("sync") signals from the first QKD station to the second QKD station over a sync signal channel;
    recording data relating to the arrival times of the sync signals at the second QKD station; and
    processing the arrival time data to discern between signals in the sync signal channel that were not sent by the first QKD station over the sync channel, and sync signals that were sent by the first QKD station over the sync channel.

2. The method of claim 1, including programming a field programmable gate array (FPGA) to detect extra signals in the sync channel that exist outside of a expected arrival time window for each sync signal.

3. The method of claim 1, wherein the processing includes performing a Fourier analysis of the sync channel.

4. The method of claim 3, including setting a noise threshold to discern between sync channel noise and a possible sync channel attack.

5. The method of claim 1, including generating an enable signal that includes an alarm enable timing window.

6. The method of claim 5, including generating an alarm signal when a signal is detected in the alarm enable timing window.

7. The method of claim 1, wherein the QKD system is a two-way QKD system.

* * * * *